(12) United States Patent
Preradovic et al.

(10) Patent No.: US 11,607,915 B2
(45) Date of Patent: Mar. 21, 2023

(54) METHOD AND DEVICE FOR MEASURING TREAD DEPTH OF A TIRE

(71) Applicant: Continental Automotive Systems, Inc., Auburn Hills, MI (US)

(72) Inventors: Djordje Preradovic, Shelby Township, MI (US); Aaron James Adler, Rochester Hills, MI (US); Akshay Choudhari, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 369 days.

(21) Appl. No.: 16/749,065

(22) Filed: Jan. 22, 2020

(65) Prior Publication Data

US 2021/0188016 A1    Jun. 24, 2021

Related U.S. Application Data

(60) Provisional application No. 62/952,590, filed on Dec. 23, 2019.

(51) Int. Cl.
| | |
|---|---|
| *B60C 11/24* | (2006.01) |
| *G01B 15/02* | (2006.01) |
| *G01M 17/02* | (2006.01) |
| *H04W 4/38* | (2018.01) |

(52) U.S. Cl.
CPC ............ *B60C 11/246* (2013.01); *G01B 15/02* (2013.01); *G01M 17/02* (2013.01); *H04W 4/38* (2018.02)

(58) Field of Classification Search
CPC ............... B60C 11/243; B60C 23/0486; B60C 23/0493; B60C 99/006; B60T 2230/02; B60T 2240/03; B60T 2240/04; B60T 8/1725; H04L 41/5003; H04L 41/5022; H04L 41/5064; H04L 41/5074; H04L 67/306; H04M 3/5233; H04N 13/204; G01B 17/00; G01B 17/02; G01B 7/26; G01M 17/02; G01M 17/024; G06V 10/44; G06V 20/647; G09G 2340/12; G09G 2380/10; G09G 5/14; G09G 5/40
See application file for complete search history.

(56) References Cited

U.S. PATENT DOCUMENTS

| | | | |
|---|---|---|---|
| 7,119,896 B2 | 10/2006 | Godeau et al. | |
| 7,269,997 B2 | 9/2007 | Dale, Jr. et al. | |
| 7,775,094 B2 | 8/2010 | Awad | |
| 9,805,697 B1 * | 10/2017 | Dorrance | ............. H04N 13/204 |

(Continued)

FOREIGN PATENT DOCUMENTS

| | | |
|---|---|---|
| CN | 106183662 | 12/2016 |
| DE | 4316984 | 8/1994 |
| JP | 2018072042 | 5/2018 |

OTHER PUBLICATIONS

Tire Tread Checking System; ECE 445 Project Proposal. TA: Samantha Knoll, Sep. 9, 2014.

*Primary Examiner* — Nimeshkumar D Patel
*Assistant Examiner* — Gedeon M Kidanu

(57) ABSTRACT

A method of measuring a tread depth of a tire includes transmitting at least one radio wave from a transmitter through a tread of the tire. The at least one radio wave reflected from a road surface is received with a receiver. The tread depth of the tire is determined based on comparing the at least one radio wave reflected from the road surface with the at least one radio wave from the transmitter.

12 Claims, 2 Drawing Sheets

(56) References Cited

U.S. PATENT DOCUMENTS

| | | | | |
|---|---|---|---|---|
| 9,831,922 | B1* | 11/2017 | Robinson | H04B 5/0043 |
| 10,619,992 | B2 | 4/2020 | Darrer | |
| 11,223,540 | B1* | 1/2022 | Lilley | H04L 67/306 |
| 2005/0268707 | A1* | 12/2005 | Dale, Jr. | G01M 17/027 |
| | | | | 73/146 |
| 2007/0084276 | A1* | 4/2007 | Matsuda | B60T 8/1725 |
| | | | | 73/146 |
| 2015/0174967 | A1* | 6/2015 | Lehmann | B60C 11/246 |
| | | | | 73/146 |
| 2017/0096036 | A1* | 4/2017 | Guinart | B60C 23/0408 |
| 2017/0097223 | A1* | 4/2017 | Darrer | B60C 11/243 |
| 2017/0361662 | A1 | 12/2017 | Wei et al. | |
| 2021/0053306 | A1* | 2/2021 | Cassidy | B60C 99/00 |

\* cited by examiner

METHOD AND DEVICE FOR MEASURING TREAD DEPTH OF A TIRE

CROSS-REFERENCE TO RELATED APPLICATIONS

This application claims priority to U.S. Provisional Application No. 62/952,590 which was filed on Dec. 23, 2019 and is incorporated herein by reference.

BACKGROUND

The present disclosure relates to measuring a tread depth of a tire and more particularly to measuring the tread depth of the tire with a device located adjacent an inner surface of the tire.

Tire pressure of a tire on a vehicle tire has been monitored for a number of years and can provide information to a vehicle operator regarding a level of inflation of the tire. When a tire is properly inflated, it can improve gas mileage of the vehicle and extend the servable life of the tire by equalizing contact forces between a tread of the tire and a surface of a road. Although a properly inflated tire will extend the serviceable life of the tire, the tire will still need to be monitored by a user or a person servicing the car to determine an amount of tread left on the tire.

SUMMARY

In one exemplary embodiment, a method of measuring a tread depth of a tire includes transmitting at least one radio wave from a transmitter through a tread of the tire. The at least one radio wave reflected from a road surface is received with a receiver. The tread depth of the tire is determined based on comparing the at least one radio wave reflected from the road surface with the at least one radio wave from the transmitter.

In a further embodiment of any of the above, determining the tread depth of the tire is determined based on at least one of measuring an elapsed time between when the at least one radio wave was transmitted by the transmitter and when the at least one radio wave reflected from the road surface was received by the receiver or measuring a phase of the at least one radio wave that was transmitted by the transmitter and a phase of the at least one radio wave reflected from the road surface and received by the receiver.

In a further embodiment of any of the above, the at least one radio wave includes a plurality of radio waves.

In a further embodiment of any of the above, a distance data set is generated based the plurality of radio waves.

In a further embodiment of any of the above, the distance data set includes distances obtained during a predetermined degree of rotation of the tire.

In a further embodiment of any of the above, the predetermined degree of rotation of the tire is determined by an accelerometer.

In a further embodiment of any of the above, the predetermined degree of rotation of the tire is between negative 45 degrees and positive 45 degrees relative a vertical line from the road surface through a center of the tire.

In a further embodiment of any of the above, a smallest distance value from the distance data set is selected when the tread depth of the tire is determined.

In a further embodiment of any of the above, a plurality of distance data sets is generated that each correspond to a single rotation of the tire. A smallest distance value is averaged for each of the plurality of distance data sets to obtain the tread depth of the tire.

In a further embodiment of any of the above, the transmitter is located on a first chipset and the receiver is located on a second chipset and the transmitter and the receiver are each in electrical communication with at least one antenna.

In a further embodiment of any of the above, the transmitter and receiver are located on a single chipset and are in electrical communication with at least one antenna.

In a further embodiment of any of the above, the radio wave includes one of a low energy Bluetooth radio wave or a 2.4 GHz ISM band radio wave.

In a further embodiment of any of the above, the radio wave is an ultra-wide band radio wave.

In a further embodiment of any of the above, the ultra-wide band radio wave is greater than or equal to 500 MHz's.

In a further embodiment of any of the above, the tire includes one of a Kevlar belted tire or a non-belted tire.

In a further embodiment of any of the above, the transmitter and receiver are aligned with an opening adjacent a metal belt in the tire.

In another exemplary embodiment, a device for measuring a tread depth of a tire includes a chipset. At least one transmitter and at least one receiver is located on the chipset. A microprocessor is configured to perform the operation of transmitting at least one radio wave from the at least one transmitter through a tread of the tire. The at least one radio wave reflected from a road surface is received with the at least one receiver. The tread depth of the tire is determined based on comparing the at least one radio wave reflected from the road surface with the at least one radio wave from the transmitter.

In a further embodiment of any of the above, the tread depth of the tire is determined based on at least one of measuring an elapsed time between when the at least one radio wave was transmitted by the transmitter and when the at least one radio wave reflected from the road surface was received by the receiver or measuring a phase of the at least one radio wave that was transmitted by the transmitter and a phase of the at least one radio wave reflected from the road surface and received by the receiver.

In a further embodiment of any of the above, the at least one radio wave includes a plurality of radio waves. The microprocessor generates a distance data set based the plurality of radio waves.

In a further embodiment of any of the above, the smallest distance value of the distance data set corresponds to the tread depth of the tire.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
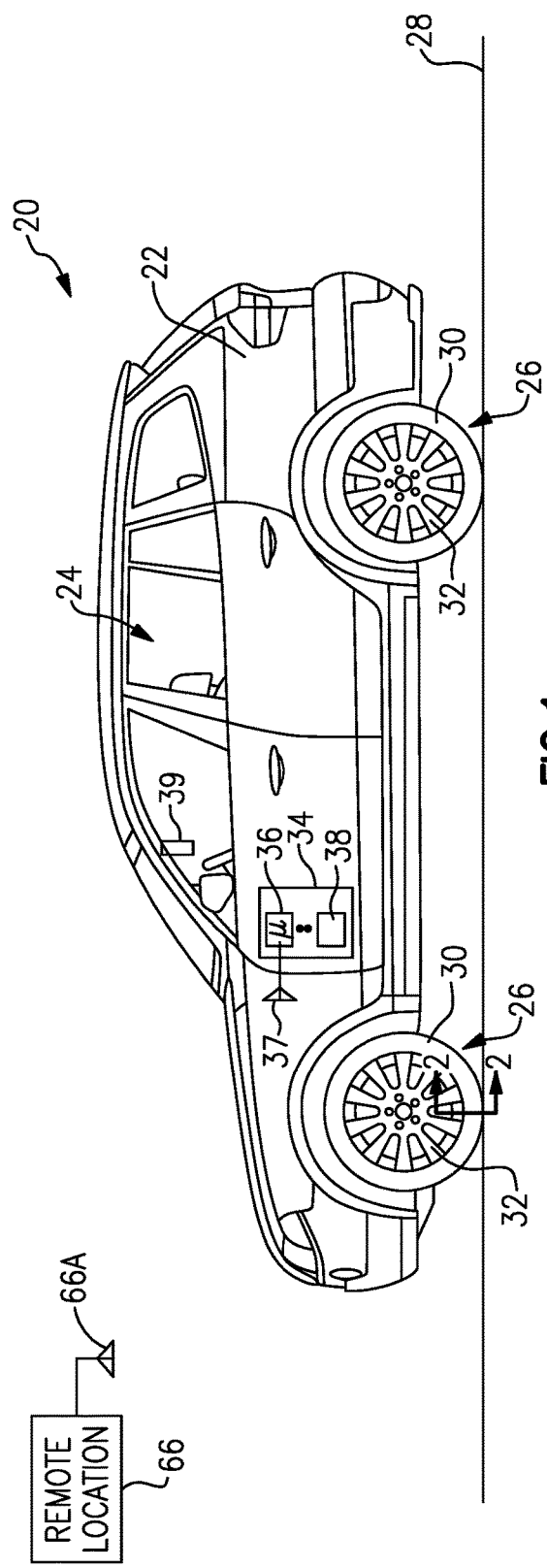
FIG. 1 illustrates a schematic view of a vehicle having a vehicle control system.

FIG. 1 illustrates an example vehicle 20 having a chassis 22 at least partially defining a passenger compartment 24 and supported on a plurality of wheels 26 for traveling along a road surface 28. Each of the wheels 26 includes a pneumatic tire 30 surrounding a rim 32. The vehicle 20 also includes a vehicle control system 34 having a microprocessor 36 in electrical communication with a computer readable medium 38 for performing the operations outlined in further detail below.

Figure 2:
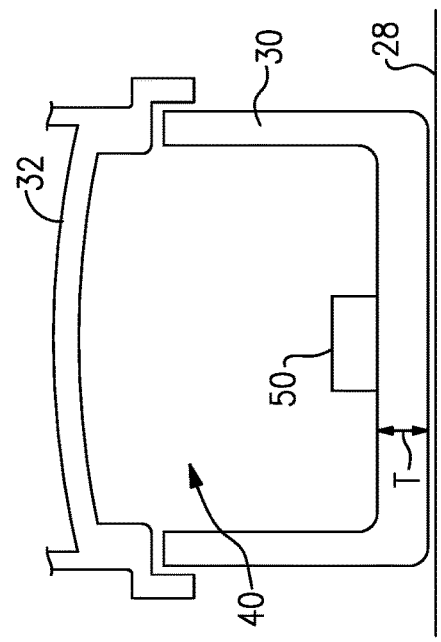
FIG. 2 illustrates a cross-sectional view taken along line 2-2 of FIG. 1.

As shown in FIG. 2, the tire 30 and the rim 32 at least partially define an internal cavity 40 that is pressurized with air or another fluid. A tread depth measuring device 50 is located inside the internal cavity 40 and is capable of measuring a tread depth T. In the illustrated example, the device 50 is attached directly to an inner side of the tire 30 such that the device 50 is in abutting contact with the inner side of the tire 30. The device 50 can be attached to the inner side of the tire 30 by an adhesive. The tread depth T corresponds to a thickness of the portion of the tire 30 in contact with the road surface 28 and in between a pair of sidewalls of the tire 30. In the illustrated example, the tire 30 is a Kevlar belted tire, a non-belted tire, or a steel belted tire. When the tire 30 is a steel belted tire, the device 50 is positioned such that the transmission or reception of the radio waves with the road surface 28 is aligned with a portion of the tire without a steel belt.

Figure 4:
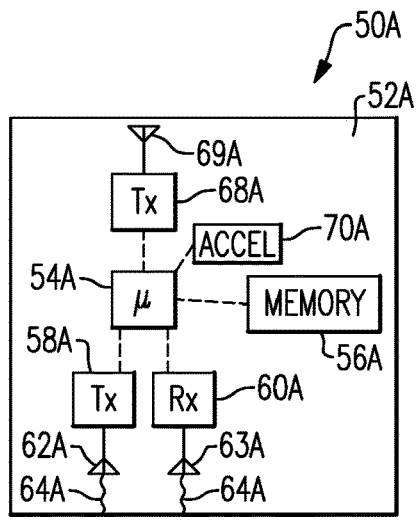
FIG. 4 illustrates an example tread depth measuring device.

FIG. 4 illustrates an example tread depth measuring devices 50A. The tread measuring device 50A includes a single chipset 52A, having a microprocessor 54A in electrical communication with a computer readable medium, such as memory 56A, a transmitter 58A, and a receiver 60A. The microprocessor 54A is also in electrical communication with an accelerometer 70A to determine a rotational position of the tire 30 and an associated position of the device 50A relative to the road surface 28.

The rotational position of the device 50A determined by the accelerometer 70A can be used by the microprocessor 54A to determine when to have the transmitter 58A begin and end sending at least one radio wave 64A. By limiting the amount of time the transmitter 58A emits the radio waves 64A, the energy consumption of the device 50A can be reduced without reducing the accuracy of the tread depth measurement. The microprocessor 54A directs the transmitter 58A to send the at least one radio wave 64A through an antenna 62A and the at least one radio wave 64A is received by an antenna 63A connected to the receiver 60A after the at least one radio wave 64A has been reflected off of the road surface 28. The microprocessor MA can then analyze the time difference between when the at least one wave 64A was transmitted and when the at least one wave 64A was received to determine the tread depth T and transmit the tread depth T to the microprocessor 36 through a transmitter 68A and an antenna 69A.

The microprocessor 36 can communicate the tread depth T to a user of the vehicle 20 on a display 39 or send the tread depth T to a remote location 66, such as a mobile device or home automation system, through communicating between an antenna 37 on the vehicle control system 34 and an antenna 66A at the remote location 66. Additionally, the tread depth T could be used to provide remaining tread levels for the tire 30, such as approximately 0%, 25%, 50%, 75%, or 100% tread life remaining.

Alternatively, the microprocessor 54A can transmit the elapsed times between transmitting and receiving the at least one wave 64A to the microprocessor 36 for analysis to determine the tread depth T. The microprocessor 36 can then display the tread depth T on the display 39 or send the tread depth T to the remote location 66 through the antenna 37.

Figure 5:
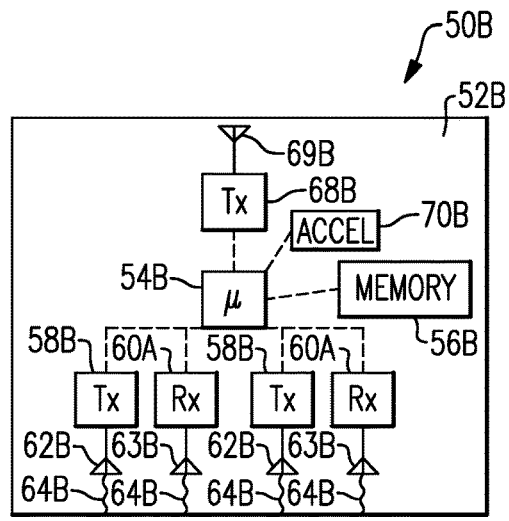
FIG. 5 illustrates another example tread depth measuring device.

FIG. 5 illustrates another example tread measuring device 50B. The tread depth measuring device 50B is similar to the tread depth measuring device 50A except where described below or shown in the Figures. Similar numbers are used between the example devices 50. The device 50B includes a single chipset 52B, having a microprocessor 54B in electrical communication with memory 56B, a first pair of transmitters 58B, and a second pair of receivers 60B. The microprocessor 54B is also in electrical communication with an accelerometer 70B to determine a rotational position of the tire 30 and a position of the device 50B relative to the road surface 28.

The microprocessor 54B directs the transmitters 58B to send at least one radio wave 64B through antenna 62B and the at least one radio wave 64B is received by one of antennas 63B on a corresponding one of the receivers 60B after being reflected off of the road surface 28. The microprocessor 54B can then analyze the time difference between when the at least one wave 64B was transmitted and when the at least one wave 64B was received to determine the tread depth T and transmit that information through a transmitter 68B and an antenna 69B as described above.

Figure 6:
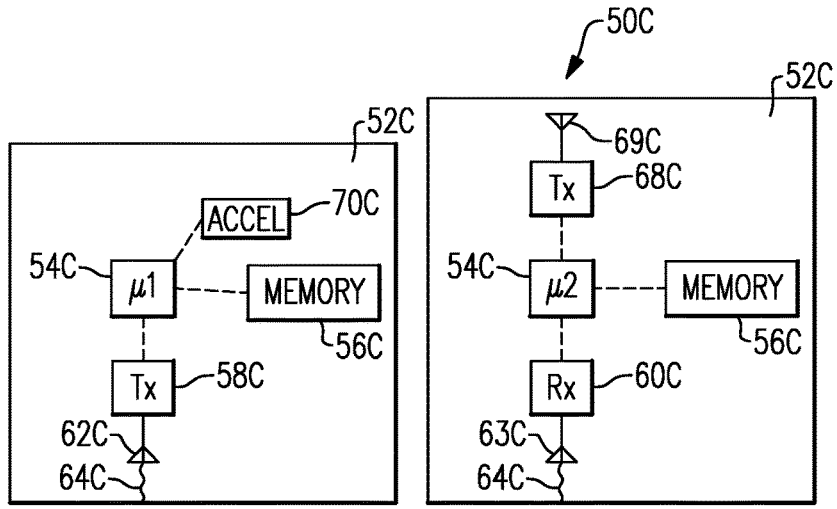
FIG. 6 illustrates yet another example tread depth measuring device.

FIG. 6 illustrates yet another example tread measuring device 50C. The tread depth measuring device 50C is similar to the tread depth measuring devices 50A, 50B except where described below or shown in the Figures. Similar numbers are used between the example devices 50. The device 50C includes a pair of chipset 52C each having a microprocessor 54C in electrical communication with memory 56C. One of the chipsets 52C includes a transmitter 58C and the other of the chipsets 52C includes a receiver 60C.

One of the microprocessors 54C directs the transmitters 58C to send at least one radio wave 64C through an antenna 62C and the at least one radio wave 64C is received by an antenna 63C on the receiver 60C after being reflected off of the road surface 28. The microprocessor 54C in control of the transmitter 58C is also in electrical communication with an accelerometer 70C to determine a rotational position of the tire 30 in order to determine when to transmit the radio waves 64C. The other of the microprocessors 54C can then analyze the time difference between when the at least one wave 64C was transmitted and when the at least one wave 64C was received to determine the tread depth T. The microprocessor 54C can then transmit that information through a transmitter 68C and an antenna 69C as described above.

Figure 7:
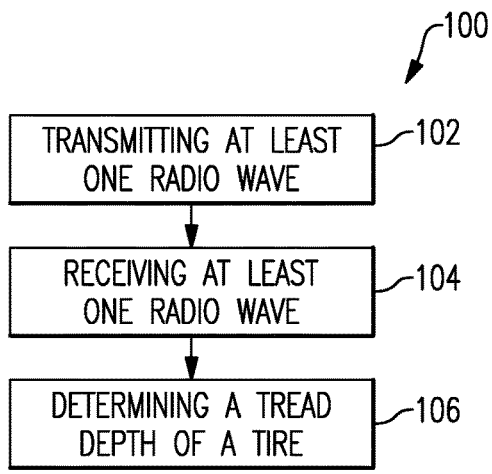
FIG. 7 illustrates an example method of measuring a tread depth of a tire.

FIG. 7 illustrates an example method 100 of operating the devices 50A, 50B, 50C to measure the tread depth T of at least one of the tires 30 on the vehicle 20. The method 100 includes transmitting at least one radio wave 64 from the transmitter 58 through a tread of the tire 30. Item 102. In the illustrated example, the at least one radio wave 64 includes at least one of a low energy Bluetooth radio wave, a 2.4 GHz ISM band radio wave, or an ultra-wide band radio wave. The ultra-wide band radio wave includes a bandwidth greater than or equal to 500 MHz's.

The receiver 60 receives the at least one radio wave 64 reflected from a road surface with the antenna 63. Item 104. The tread depth T of the tire 30 can then be determined based on the at least one radio wave 64 reflected from the road surface 28. Item 106. For example, the tread depth T of the tire 30 is determined based on an elapsed time between transmitting the at least one radio wave 64 with the transmitter 58 and receiving the at least one radio wave 64 with the receiver 60. Alternatively, the at least one radio wave 64 includes a plurality of radio waves across multiple frequencies and the receiver 60 compares the phase of the sent and reflected radio waves 64 and or measures time of flight.

Additionally, more than one radio wave 64 can be transmitted in a burst determine the tread depth T of the tire 30. When the more than one radio wave 64 is being transmitted, the radio waves 64 are usually being transmitted over a period of time corresponding to a predetermined degree of rotation of the tire 30 to produce multiple measurements. Because multiple measurements are taken over a period of time and through the predetermined degree of rotation of the tire 30, a distance data set is generated representing distances measured by the devices 50A, 50B, 50C through the predetermined degrees of rotation.

Figure 3:
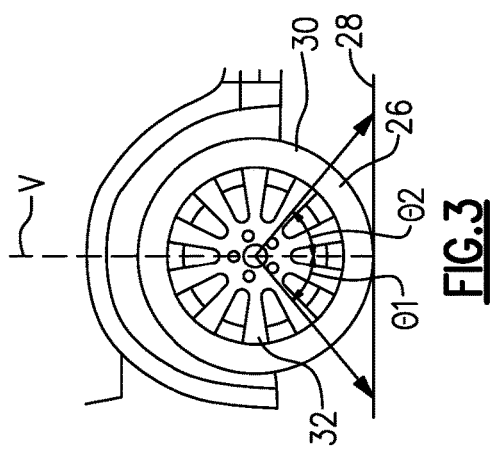
FIG. 3 illustrates an enlarged view of a wheel on the vehicle of FIG. 1.

As shown in FIG. 3, the devices 50A, 50B, 50C may record measurements beginning at an angle of $\theta_1$ relative to a vertical centerline V of the road surface 28 through a center of rotation of the tire 30 and continue measuring distance through rotation $\theta_2$ off of the vertical centerline V. Because the devices 50A, 50B, 50C move closer to the road surface 28 and then further away from the road surface 28 through a rotation, a distance in the distance data set having the smallest value corresponds to the tread depth T of the tire 30. The devices 50A, 50B, 50C can determine movement between the angles $\theta_1$ and $\theta_2$ through the use of the accelerometers 70A, 70B, 70C. In one example, $\theta_1$ and $\theta_2$ are each 45 degrees. However, $\theta_1$ or $\theta_2$ could be less than 45 degrees to reduce a size of the distance data set measured with each rotation.

Additionally, the smallest value for the tread depth T could be averaged over multiple rotations of the tire 30. By using the measurement of the average tread depth T over multiple rotations, variations in the distance that result from varying road conditions can be reduced to provide a more accurate value for the tread depth T of the tire 30. In one example, the tread depth T could be averaged over 50 rotations of the tire 30 and in another example, the tread depth T could be averaged over 100 rotations of the tire 30.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of measuring a tread depth of a tire, the method comprising:

transmitting at least one radio wave from a transmitter through a tread of the tire;
receiving the at least one radio wave reflected from a road surface with a receiver;
determining the tread depth of the tire based on comparing the at least one radio wave reflected from the road surface with the at least one radio wave from the transmitter; and
generating a distance data set based on a plurality of radio waves;
wherein the determining of the tread depth of the tire is based on at least one of measuring an elapsed time between when the at least one radio wave was transmitted by the transmitter and when the at least one radio wave reflected from the road surface was received by the receiver or measuring a phase of the at least one radio wave that was transmitted by the transmitter and a phase of the at least one radio wave reflected from the road surface and received by the receiver,
wherein the at least one radio wave includes the plurality of radio waves,
wherein the distance data set includes distances obtained during a predetermined degree of rotation of the tire, and
wherein determining the tread depth of the tire includes selecting a smallest distance value from the distance data set.

2. The method of claim 1, wherein the predetermined degree of rotation of the tire is determined by an accelerometer.

3. The method of claim 1, wherein the predetermined degree of rotation of the tire is between negative 45 degrees and positive 45 degrees relative a vertical line from the road surface through a center of the tire.

4. The method of claim 1, including generating a plurality of distance data sets each corresponding to a single rotation of the tire and averaging a smallest distance value for each of the plurality of distance data sets to obtain the tread depth of the tire.

5. The method of claim 1, wherein the transmitter is located on a first chipset and the receiver is located on a second chipset and the transmitter and the receiver are each in electrical communication with at least one antenna.

6. The method of claim 1, wherein the transmitter and receiver are located on a single chipset and are in electrical communication with at least one antenna.

7. The method of claim 1, wherein the radio wave includes one of a low energy Bluetooth radio wave or a 2.4 GHz ISM band radio wave.

8. The method of claim 1, wherein the tire includes one of a Kevlar belted tire or a non-belted tire.

9. The method of claim 1, wherein the transmitter and receiver are aligned with an opening adjacent a metal belt in the tire.

10. The method of claim 1, wherein the radio wave is an ultra-wide band radio wave.

11. The method of claim 10, wherein the ultra-wide band radio wave is greater than or equal to 500 MHz's.

12. A device for measuring a tread depth of a tire comprising:

a chipset;
at least one transmitter and at least one receiver located on the chipset; and
a microprocessor configured to perform the following operations:
transmitting at least one radio wave from the at least one transmitter through a tread of the tire;

receiving the at least one radio wave reflected from a road surface with the at least one receiver; and determining the tread depth of the tire based on comparing the at least one radio wave reflected from the road surface with the at least one radio wave from the transmitter, wherein determining the tread depth of the tire is based on at least one of measuring an elapsed time between when the at least one radio wave was transmitted by the transmitter and when the at least one radio wave reflected from the road surface was received by the receiver or measuring a phase of the at least one radio wave that was transmitted by the transmitter and a phase of the at least one radio wave reflected from the road surface and received by the receiver, wherein the at least one radio wave includes a plurality of radio waves and the microprocessor generates a distance data set based the plurality of radio waves, and wherein the smallest distance value of the distance data set corresponds to the tread depth of the tire.

\* \* \* \* \*